May 25, 1943.  D. V. EDWARDS  2,320,224
RECTIFIER CIRCUIT
Filed April 8, 1942
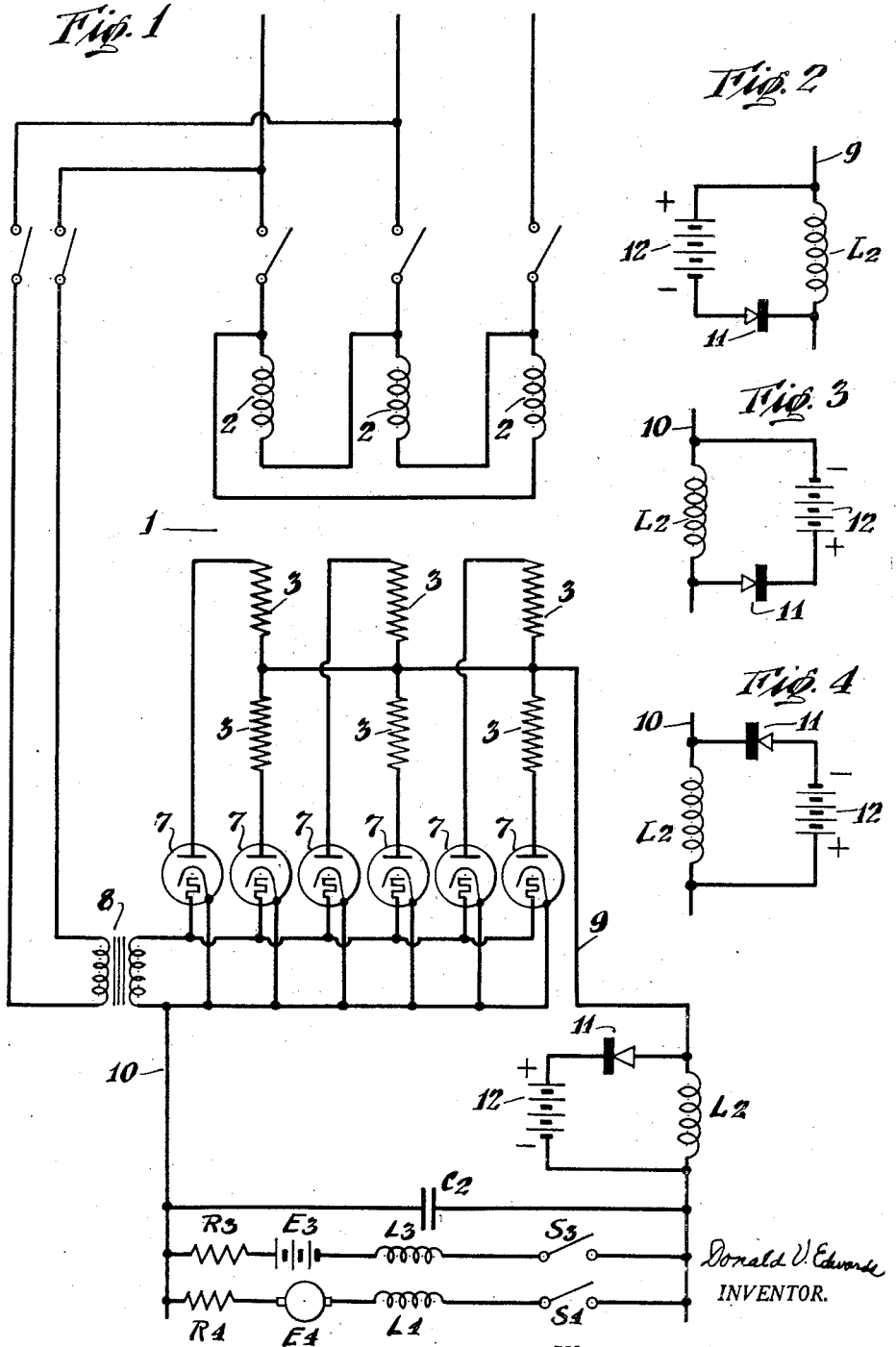
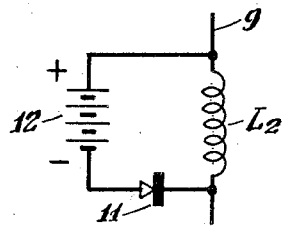
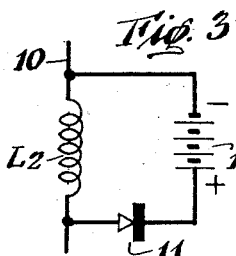
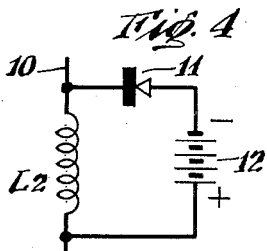
Donald V. Edwards
INVENTOR.
BY
Edwards, Bower & Pool
ATTORNEYS Patented May 25, 1943

2,320,224

UNITED STATES PATENT OFFICE 2,320,224

RECTIFIER CIRCUIT

Donald V. Edwards, Montclair, N. J., assignor to Electrons, Inc., a corporation of Delaware Application April 8, 1942, Serial No. 438,057

9 Claims. (Cl. 175—363)

This invention relates to electrical rectifier circuits for the conversion of alternating current to direct current. It is particularly applicable to circuits which include power rectifiers carrying substantial currents and having smoothing inductance in series with the direct-current load.

Heretofore, a failure, commonly known as an arc-back, which results from the application of a large inverse voltage to the rectifier and consequent breakdown thereof, has been unpredictable. Its occurrence has been accepted as a purely random phenomenon. Such failure occurs when the rectifying element is defective. It has also been observed in circuits where the rectifying elements are not defective and are capable of withstanding more than ten times the peak inverse voltage normally applied each cycle of the alternating-current supply frequency.

The object of the invention is to provide a circuit which will minimize the inverse voltage surges applied to the rectifying elements, particularly the severe ones incident to switching operations in the direct-current circuit.

My invention will be described with reference to the drawing, in which

Fig. 1 illustrates diagrammatically a circuit embodying the invention in its preferred form, and Figs. 2, 3 and 4 are details illustrating different methods of connecting the auxiliary circuit.

Referring to the drawing which shows diagrammatically a six-phase rectifier and associated circuit, a three-phase, alternating current power supply is connected to transformer 1, having delta-connected primary windings 2, 2, 2, and star-connected secondary windings 3—3,3. The outside ends of the secondary windings 3 are connected to rectifying elements 7—7,7. In the figure these are shown as hot-cathode, gas-filled rectifier tubes, though the invention applies equally well if mercury pool, dry disc, or any other rectifying element is used. Cathode heating energy is supplied to the tubes by means of transformer 8. This constitutes a conventional rectifier circuit where the center-tap lead 9 of the secondary winding is the negative direct-current lead, and the common cathode connection 10 is the positive lead of the direct current. The usual smoothing inductance to suppress the circulation of harmonic current in the direct-current load circuit is shown at $L_2$.

A representative load consisting of electric motors may be indicated for purposes of analysis by the motor-back electromotive forces such as $E_3$ and $E_4$ and the respective internal motor resistances $R_3$ and $R_4$ and inductances $L_3$ or $L_4$ accompanying each. Such individual motor circuits are controlled by switches $S_3$, $S_4$. The stray capacitance of the direct-current circuit and the filter capacitance, if used, is indicated at $C_2$.

Thus far described the circuit exemplifies one commonly met with in practice. Upon opening of circuit breakers $S_3$, $S_4$ it is subject to a discharge of energy stored in coil $L_2$ to and through rectifiers 7 into condenser $C_2$ and consequent inverse discharge therefrom to the tubes 7, the voltage of which discharge is inverse to the normal direction of current through said tubes, and if sufficiently high may break down the inverse resistance of the tube.

To prevent or minimize such surge inverse voltage, I provide an auxiliary circuit comprising rectifier 11 (in the form shown in Fig. 1) in series with a storage battery 12 connected across the inductance $L_2$, the polarities of the rectifier and battery being as indicated in the drawing, whereby current may flow through the rectifier 11 to charge the battery 12, but not in the inverse direction to permit discharge from the battery. In the figures a battery 12 is shown in series with the auxiliary rectifier 11 though the invention applies if some other energy-storing element is used, such as a regulating type of electrolytic capacitor.

When operating on a steady load the direct current of the circuit creates no drop in voltage across inductance $L_2$ and hence the shunt circuit through rectifier 11 and battery 12 is inactive. Any attempt to change current through the inductance momentarily generates whatever voltage across its terminals that is necessary to resist the change. Thus an attempt to decrease the current flowing through inductance $L_2$ in Fig. 1 would cause the terminal shown as the uppermost one in the drawing, i. e., the one connected to the rectifier 11, to become positive relative to the lower terminal. The instantaneous value of this voltage will rise to whatever amount is necessary to continue the current flow. An attempt to increase current would induce an opposite voltage, making the voltage of the terminal shown as the upper one, negative relative to the lower terminal.

The polarities of the rectifier 11 and battery 12 are seen to be such that whenever the voltage induced in the inductance $L_2$ by a decrease in main rectifier current exceeds the battery voltage, a momentary current flows through the auxiliary rectifier 11 through the battery 12 in opposition to its voltage, thereby charging it, and back through inductance $L_2$. In other words, whenever current in lead 9 is decreased a circulating current flows momentarily through the auxiliary rectifier 11 and battery 12, allowing the total current in inductance $L_2$ to continue and die out without surge.

When the main rectifier is operating on a steady load there is a slight increase and decrease or ripple of the load current during each cycle due to the pulsating nature of the output of a rectifier. It is the function of the inductance to generate a small A. C. voltage to resist or smooth out these current changes. This small A. C. voltage across inductance $L_2$ is also applied to the shunt circut consisting of auxiliary rectifier 11 and battery 12. The auxiliary rectifier blocks the voltage of the battery and prevents discharge current. By making the battery voltage across the inductance slightly higher than the peak of the small A. C. voltage across inductance $L_2$ created by the ripple, the blocking action continues throughout the cycle and no current flows in the auxiliary rectifier circuit under steady load. Thus the auxiliary rectifier circuit does not interfere with the normal smoothing action of the inductance $L_2$. The battery need not be larger because the ripple voltage is only a fraction of the rectifier output voltage. For instance, with a 6-phase circuit shown in the drawing, the battery voltage should be approximately 9% of the direct current voltage.

Under steady load conditions with switch $S_3$ closed and current I flowing through the motor, $C_2$ will be charged to the direct-current line voltage E holding $$\frac{E^2C^2}{2}$$

watt seconds, and inductances $L_2$ and $L_3$ will have stored magnetic energy equal to $$\frac{I^2L_2}{2} \text{ and } \frac{I^2L_3}{3}$$

watt seconds, respectively. A transient occurs on removal of load due to redistribution of this energy. It may be produced by opening switch $S_3$.

When the contacts of switch $S_3$ are separated, the various inductances will generate whatever voltage is necessary to continue the flow of current through them until their stored energy is spent. Current thus continues to flow until the enery stored in $L_3$ is dissipated in the arc at the switch and in $R_3$. With a good switch the current is brought to zero within a few thousandths of a second. So rapid a readjustment of current flowing through the smoothing inductance, $L_2$ however would be accompanied by disruptive voltages across it, as $L_2$ is large in order to be effective toward suppressing ripple current under steady operating conditions. Hence main rectifier current through $L_2$ dies out more slowly than the load current.

In the conventional rectifier circuit the difference between the instantaneous current through $L_2$ and that through the load flows into condenser $C_2$, charging it to a voltage substantially equal to the square root of $$\frac{I^2L_2}{C_2}$$

before current in $L_2$ is finally brought to rest. As current in $L_2$ reaches zero the induced voltage vanishes and the full voltage charge on $C_2$, often amounting to ten times normal, appears across the rectifying elements, causing an arc-back.

In my invention the auxiliary rectifier 11 provides an alternative path for the excess current flowing through $L_2$, which path becomes available as soon as the induced voltage in $L_2$ exceeds the normal ripple voltage by a few volts and remains at this voltage until the stored magnetic energy in $L_2$ has been transferred to the storage battery. In this case, when the current in $L_2$ reaches zero a harmless charge remains on condenser $C_2$ exceeding the normal charge by the battery voltage only. Thus the rectifier elements are not overstressed with inverse voltage, and no arc back occurs.

When two or more motors are running simultaneously, conditions are much the same as above described. Consider switch $S_3$ and $S_4$ closed and the respective motors running. When $S_3$ is opened, current dies out rapidly through $L_3$, more slowly through $L_2$ as before. However the inductance $L_4$ resists a change of current through the remaining motor with the result that the excess current seeks out the auxiliary rectifier path and charges battery 12 instead of overcharging condenser $C_2$.

On increasing load a transient appears across inductance $L_2$ which lowers the main rectifier output voltage and absorbs energy, storing it magnetically. Under these conditions no surge voltages are applied to the main rectifying elements, and the auxiliary rectifier forbids any participation on the part of battery 12.

The special case when the rectifiers 7 are first energized deserves mention. Condenser $C_2$ being initially discharged, charges up rapidly to direct-current voltage through inductance $L_2$. At the instant it reaches line voltage, maximum charging current is flowing through $L_2$ representing stored energy. In the conventional rectifier this causes the condenser voltage to overshoot to approximately double voltage. By the present invention, charging ceases as soon as $C_2$ reaches line voltage plus battery voltage, and the magnetically stored energy in the inductance $L_2$ proceeds to flow into the battery, thereby avoiding the application of excess surge voltage to the main rectifying elements.

In most applications the occasional charge flowing into battery 12 supplies battery losses. Any excess charging decomposes some of the battery water. Because of the relatively minute part of the total rectifier operating time that transients occur, and the fact that the transients last less than a second, the battery and auxiliary rectifier may be small even though the actual rate of charging during the surge is enormous. On systems where surges occur frequently a small bleeder load may be applied to the battery to compensate for the numerous charges.

While the connection shown in Fig. 1 is the preferred form, similar results may be obtained by employing the connection shown in Figs. 2, 3 and 4.

In Fig. 2 the rectifier 11 is shown on the opposite side of the battery from the showing in Fig. 1.

In Figs. 3 and 4 the rectifier 11 is connected to permit current to flow from the normally positive side of the coil $L_2$.

The above considerations have been described for a six-phase rectifier. However, they apply equally well to a rectifier of any number of phases except a half-wave rectifier. They also apply to bridge and series rectifier circuits.

I claim:

1. A rectifier circuit comprising a source of alternating current connected through two or more rectifying elements to a direct current load circuit having series inductance and variable current consuming load, said load circuit having shunted across it capacitance of a value sufficient to produce the possibility of arc back, an additional rectifying element and a battery in series with each other and so connected across the inductance that the induced voltage generated by a decrease of the rectifier output current causes current to flow through the auxiliary rectifier.

2. A rectifier circuit comprising a source of alternating current connected through two or more rectifying elements to a direct current load circuit having series inductance and switch-connected current consuming load, said load circuit having shunted across it capacitance of a value sufficient to produce the possibility of arc back, an auxiliary rectifier circuit comprising a rectifier element and a battery in series with each other, so connected across the inductance that abnormal currents flow in normal direction through the auxiliary rectifier to charge said battery.

3. A rectifier circuit comprising a source of alternating current connected through two or more rectifying elements to a direct current load circuit having series inductance and variable current consuming load, said load circuit having shunted across it capacitance of a value sufficient to produce the possibility of arc back, an additional rectifying element and energy storing means connected in series with each other and so connected across the inductance that the induced voltage generated by a decrease of the rectifier output current causes current to flow through the auxiliary rectifier.

4. A rectifier circuit comprising a source of alternating current connected through two or more rectifying elements to a direct current load circuit having series inductance and switch-connected current consuming load, said load circuit having shunted across it capacitance of a value sufficient to produce the possibility of arc back, an additional rectifying element and a battery of a voltage a fractional part of the direct current voltage in series with each other, and so connected across the inductance that the induced voltage generated by a decrease of the normal rectifier output current causes current to flow through the auxiliary rectifier to charge said battery.

5. A rectifier circuit comprising a source of alternating current connected through two or more rectifying elements to a direct current load circuit having series inductance and switch-connected current consuming load and capacitance in parallel with said current consuming load, said capacitance in said load circuit being of a value sufficient to produce the possibility of arc back, an additional rectifying element and a battery in series with each other and so connected across the inductance that upon opening the switch connection abnormal current flows through the auxiliary rectifier in the normal direction and charges said battery.

6. A rectifying unit comprising a main rectifier of two or more rectifying elements adapted to be connected with an alternating current input circuit and to a direct current load circuit, the latter circuit having series inductance and switch-connected current consuming load and a capacitance shunted across it of a value sufficient to produce the possibility of arc back, an auxiliary rectifier circuit consisting of a rectifying element and an associated battery in series with each other adapted to be connected across said series inductance.

7. A rectifier circuit comprising a source of alternating current connected through two or more rectifying elements to a direct current load circuit having series inductance and switch-connected current consuming load, said load circuit having shunted across it capacitance of a value sufficient to produce the possibility of arc back, an auxiliary rectifying element and a battery in series with each other, the input of the auxiliary rectifier being connected to the direct current circuit between the series inductance and the positive side of the auxiliary rectifying element, and the positive side of the battery being connected to the output side of the auxiliary rectifying element.

8. A rectifier circuit comprising a source of alternating current connected through two or more rectifying elements to a direct current load circuit having series inductance and switch-connected current consuming load, said load circuit having shunted across it capacitance of a value sufficient to produce the possibility of arc back, an auxiliary rectifying element and a battery in series with each other, the positive side of the battery being connected to the direct current series inductance and the input of the auxiliary rectifying element being connected between the negative side of the battery and the positive side of the auxiliary rectifying element.

9. An auxiliary rectifier circuit comprising a rectifying element and a battery in series with each other so connected across a smoothing inductance in series with the direct current consuming load circuit of a primary rectifier circuit with two or more rectifying elements that induced voltage generated by a decrease in normal primary rectifier output current causes current to flow through and be absorbed by said auxiliary rectifier circuit, said load circuit having shunted across it capacitance of a value sufficient to produce the possibility of arc back.

DONALD V. EDWARDS.